(12) United States Patent
Avery et al.

(10) Patent No.: US 9,925,954 B2
(45) Date of Patent: *Mar. 27, 2018

(54) SYSTEM FOR ASSIGNING A SMARTPHONE AS A TEMPORARY KEY FOR A VEHICLE

(71) Applicant: Panasonic Automotive Systems Company of America, Division of Panasonic Corporation of North America, Peachtree City, GA (US)

(72) Inventors: John Avery, Newnan, GA (US); Adeel Yusuf, Atlanta, GA (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/421,693

(22) Filed: Feb. 1, 2017

(65) Prior Publication Data

US 2017/0136991 A1 May 18, 2017

Related U.S. Application Data

(63) Continuation of application No. 14/259,804, filed on Apr. 23, 2014, now Pat. No. 9,595,145.

(51) Int. Cl.
*B60R 25/01* (2013.01)
*B60R 25/24* (2013.01)
(Continued)

(52) U.S. Cl.
CPC ............ *B60R 25/241* (2013.01); *B60R 25/01* (2013.01); *B60R 25/209* (2013.01); *G08C 17/02* (2013.01);
(Continued)

(58) Field of Classification Search
CPC ....................................................... H04W 8/005
See application file for complete search history.

(56) References Cited

U.S. PATENT DOCUMENTS

| | | | |
|---|---|---|---|
| 2011/0053557 A1* | 3/2011 | Despain | A47G 29/10 455/410 |
| 2014/0079217 A1* | 3/2014 | Bai | H04L 63/0869 380/270 |

(Continued)

OTHER PUBLICATIONS

Peter Valdes-Dapena, Your Phone Could Soon Be Your Car Key, Money.CNN, Feb. 24, 2016, 2 pages, http://money.cnn.com/2016/02/22/luxury/volvo-phone-app-start-drive/.

*Primary Examiner* — Laura Nguyen
(74) *Attorney, Agent, or Firm* — Laurence S. Roach, Esq.

(57) ABSTRACT

A method of providing access to a vehicle, including wirelessly and electronically discovering a personal electronic device disposed outside of the vehicle. A remote central controller is wirelessly instructed to wirelessly transmit a certificate to the personal electronic device. The certificate from the personal electronic device is wirelessly received within the vehicle. Validation from the a remote central controller that the certificate from the personal electronic device was transmitted from the remote central controller to the personal electronic device is wirelessly received within the vehicle. An electronic key to the vehicle is wirelessly transmitted from the vehicle to the personal electronic device.

20 Claims, 7 Drawing Sheets

(51) Int. Cl.
*H04W 8/00* (2009.01)
*G08C 17/02* (2006.01)
*B60R 25/20* (2013.01)

(52) U.S. Cl.
CPC ....... *H04W 8/005* (2013.01); *B60R 2325/205* (2013.01); *G08C 2201/93* (2013.01)

(56) References Cited

U.S. PATENT DOCUMENTS

| | | | | |
|---|---|---|---|---|
| 2014/0169564 A1* | 6/2014 | Gautama | ............ | G07C 9/00309 380/270 |
| 2014/0266573 A1* | 9/2014 | Sullivan | ............. | G07C 9/00571 340/4.32 |
| 2014/0270172 A1* | 9/2014 | Peirce | ................... | H04L 9/0819 380/270 |
| 2014/0298023 A1* | 10/2014 | Oppermann | .......... | H04W 4/008 713/168 |
| 2016/0368456 A1* | 12/2016 | Outwater | ................ | B60R 25/04 |

* cited by examiner

SYSTEM FOR ASSIGNING A SMARTPHONE AS A TEMPORARY KEY FOR A VEHICLE

CROSS-REFERENCE TO RELATED APPLICATION

This application is a continuation of U.S. patent application Ser. No. 14/259,804, filed on Apr. 23, 2014, which is currently under allowance, the disclosure of which is hereby incorporated by reference in its entirety for all purposes.

BACKGROUND OF THE INVENTION

1. Field of the Invention

The present invention relates to a method for starting a motor vehicle, and, more particularly, to a method for starting a motor vehicle without a physical key or a permanent remote key.

2. Description of the Related Art

It is known to start a motor vehicle by use of a physical key or by use of a permanent remote key. A problem is that only a fixed number of such physical keys or permanent remote keys are associated with a particular vehicle, and it is time consuming and fairly lengthy and/or inconvenient process to create additional such physical keys or permanent remote keys. Another problem is that physical keys or permanent remote keys are permanent pieces of hardware associated with a particular vehicle. If a temporary user of such a dedicated key does not return the key to the owner of the vehicle after use, then the key is lost to the owner and must be replaced by the owner.

SUMMARY OF THE INVENTION

The invention may provide a system for instantly and dynamically creating new temporary keys for a vehicle. The invention may provide a system for assigning temporary rights to use a cell phone as a key for a vehicle and to invoke parental controls on the vehicle when the temporary key is in use. This could be useful for allowing other people to temporarily use the vehicle without having access to the physical key.

The owner of a vehicle, while in the vehicle with his key fob or physical key, may use the headunit interface to identify a cell phone over Bluetooth and/or near field communication (NFC) to assign that cell phone as a temporary key for that vehicle. An application on the cell phone can be used to further enhance the security using public-key infrastructure (PM) techniques. In addition, each temporary cell phone/key can be assigned to specific vehicle modes for special use cases. Such vehicle modes may include a limit on the speed at which the vehicle may travel; a limit on the number of miles the vehicle may travel; a limit on the distance from a certain location (e.g., the owner's home) that the vehicle may travel; a limit on the times of operation of the vehicle; a limit or restriction on the operation of the temporary cell phone (e.g., texting, data, and/or voice) while the vehicle is moving or in operation; a limit on the speed of the vehicle when the vehicle is not on public roads (e.g., on driveways or parking lots) etc.

The invention comprises, in one form thereof, a method of providing access to a vehicle, including wirelessly and electronically discovering a personal electronic device disposed outside of the vehicle. A remote central controller is wirelessly instructed to wirelessly transmit a certificate to the personal electronic device. The certificate from the personal electronic device is wirelessly received within the vehicle. Validation from the a remote central controller that the certificate from the personal electronic device was transmitted from the remote central controller to the personal electronic device is wirelessly received within the vehicle. An electronic key to the vehicle is wirelessly transmitted from the vehicle to the personal electronic device.

The invention comprises, in another form thereof, a method of providing access to a vehicle, including wirelessly and electronically discovering a personal electronic device disposed outside of the vehicle. A selection of the personal electronic device is received from a user. An electronic key to the vehicle is wirelessly transmitted from the vehicle to the selected personal electronic device.

The invention comprises, in yet another form thereof, a method of providing access to a vehicle, including enabling a user to choose between providing access online and providing access offline. If the user chooses providing access online, then a personal electronic device disposed outside of the vehicle is electronically discovered. A remote central controller is instructed to transmit a certificate to the personal electronic device. The certificate from the personal electronic device is received within the vehicle. Validation from the remote central controller that the certificate from the personal electronic device was transmitted from the remote central controller to the personal electronic device is receiving within the vehicle. An electronic key to the vehicle is transmitted from the vehicle to the personal electronic device. If the user chooses providing access offline, then a personal electronic device disposed outside of the vehicle is electronically discovered. A selection of the personal electronic device is received from a user. An electronic key to the vehicle is transmitted from the vehicle to the selected personal electronic device.

An advantage of the present invention is that it may enables the owner of a vehicle the ability to temporarily assign a cell phone as a key for the vehicle along with limiting the vehicles functionality while that cell phone is used as a key.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
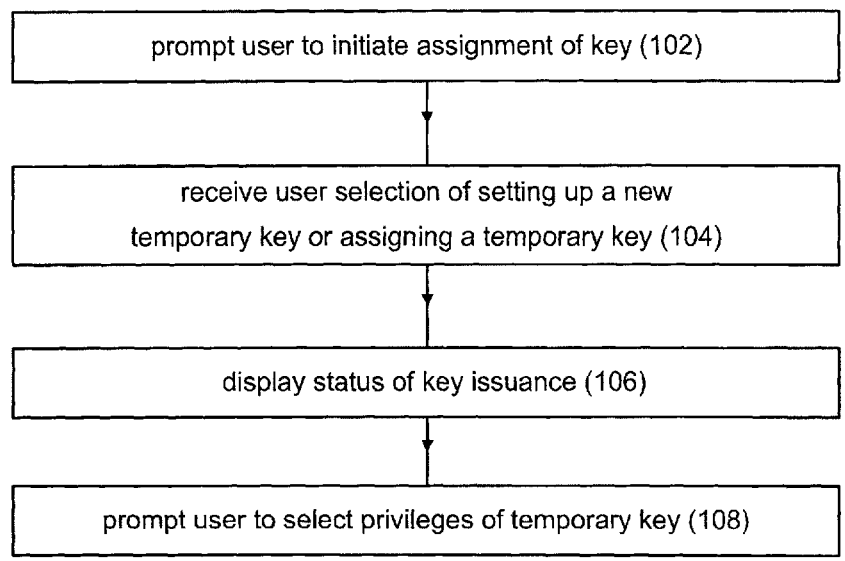
FIG. 1 is a flow chart illustrating a method of assigning a smartphone as a temporary vehicle key according to one embodiment of the present invention.
Figure 2:
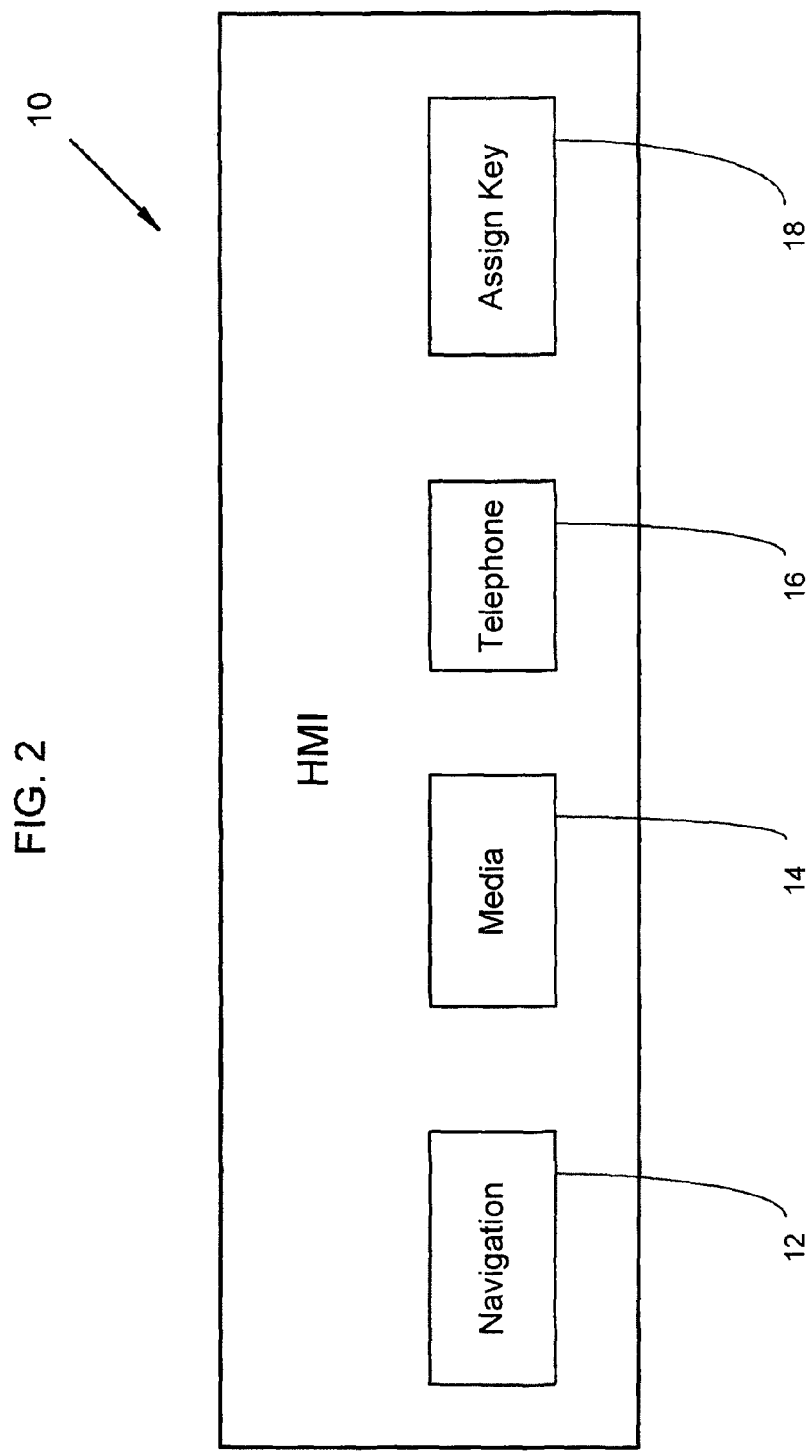
FIG. 2 is an example screen shot of a vehicle human machine interface in a first step of the method of FIG. 1.

FIG. 1 illustrates a method 100 of assigning a smartphone as a temporary vehicle key according to one embodiment of the present invention. In a first step 102, the user is prompted to initiate the assignment of a key. FIG. 2 is an example screen shot of a vehicle human machine interface (HMI) 10 which may be used in step 102. HMI 10 includes a navigation icon 12, a media icon 14, a telephone icon 16, and an icon 18 for assigning a vehicle key to a telephone. Navigation icon 12 may enable a user to interface with a vehicle navigation system (not shown); media icon 14 may enable a user to interface with a vehicle audio system (not shown), which may include a radio, a CD player, etc.; phone icon 16 may enable a user to converse via his personal mobile telephone by using the speakers and microphones associated with HMI 10; and icon 18 may enable a user to assign and/or transfer an electronic vehicle key to an external mobile telephone or other personal electronic device.

In a next step 104, the user may select either to set up a new temporary key or to assign a temporary key. For example, after the user touches icon 18, the display screen of HMI 10 may change to the presentation shown in FIG. 3. The user then has the choice of setting up a new mobile phone to receive a temporary key, as at 20, or actually sending a temporary key to a mobile phone that has already been set up, as at 22. Upon the touching of icon 18, the head unit may automatically search for nearby mobile electronic devices that have not already been set up to receive a temporary key. The head unit may use Bluetooth and/or NFC in order to find the nearby mobile electronic devices. In the example shown, the head unit has found new nearby mobile phones X and Y which have not yet been set up to receive a temporary key. The head unit has already set up the existing candidate mobile phones A, B and C to receive a temporary key.

If the user chooses to set up one or both of new devices X and Y in the vicinity, then the user may further choose whether to set up the new device online (e.g., via wireless communication with a remote authorization controller, as discussed in more detail hereinbelow with regard to FIG. 6), or offline via wireless communication exclusively and directly between the head unit and the new mobile electronic device (as discussed in more detail hereinbelow with regard to FIG. 7). More particularly, the user may choose to set up a new device online by touching ONLINE icon 24 to use system 30 of FIG. 6, or may choose to set up a new device offline by touching OFFLINE icon 26 to use system 60 of FIG. 7.

Figure 6:
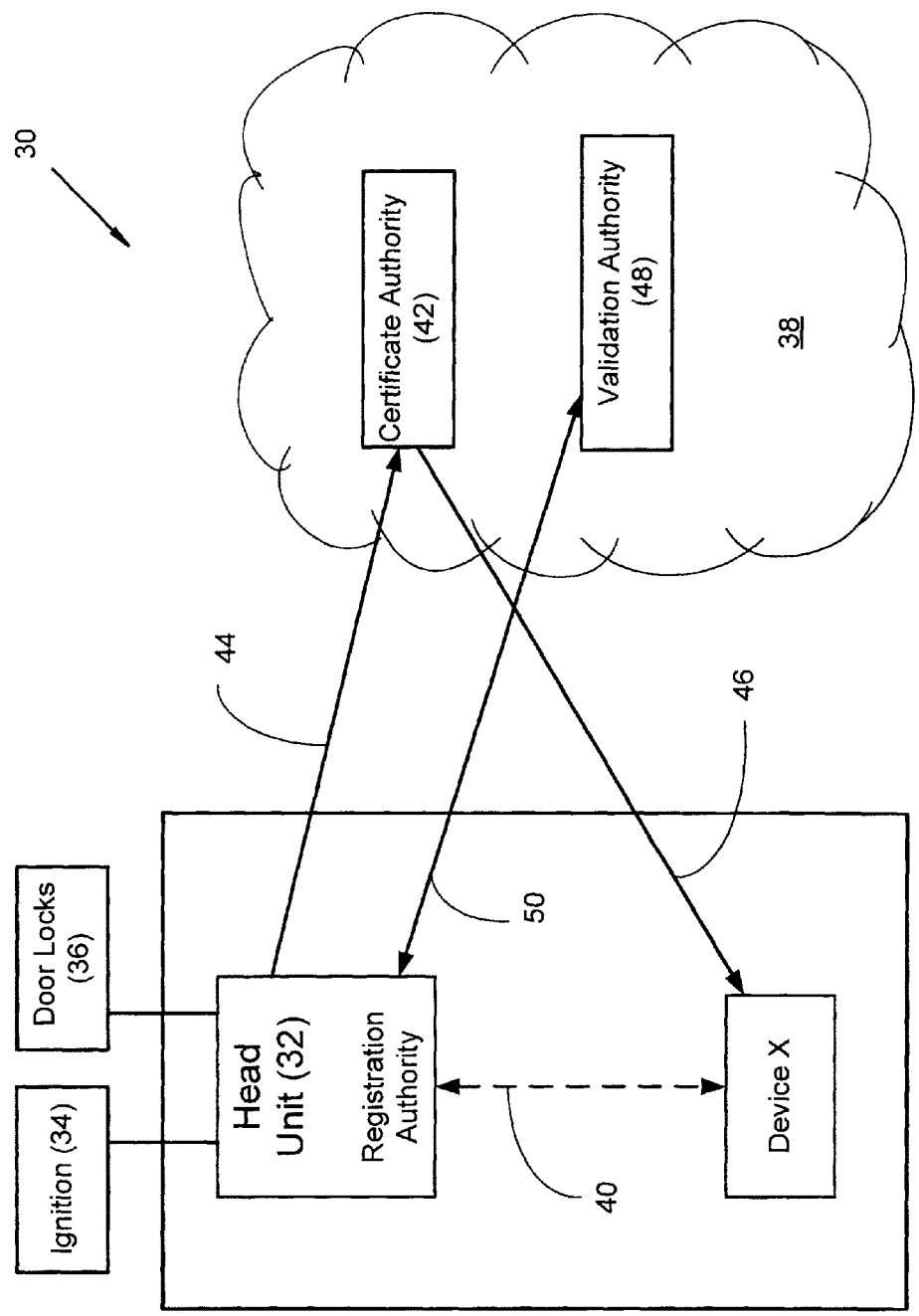
FIG. 6 is a block diagram of a first embodiment of a system of the invention for assigning a smartphone as a temporary key for a vehicle.

FIG. 6 is a block diagram of one embodiment of a system 30 of the invention for online assignment of a temporary key for a vehicle to a smartphone X. System 30 may employ PM, for example, as a communication technology. System 30 includes a vehicle head unit 32, a vehicle ignition system 34, vehicle door lock controls 36, and a central controller 38.

Figure 3:
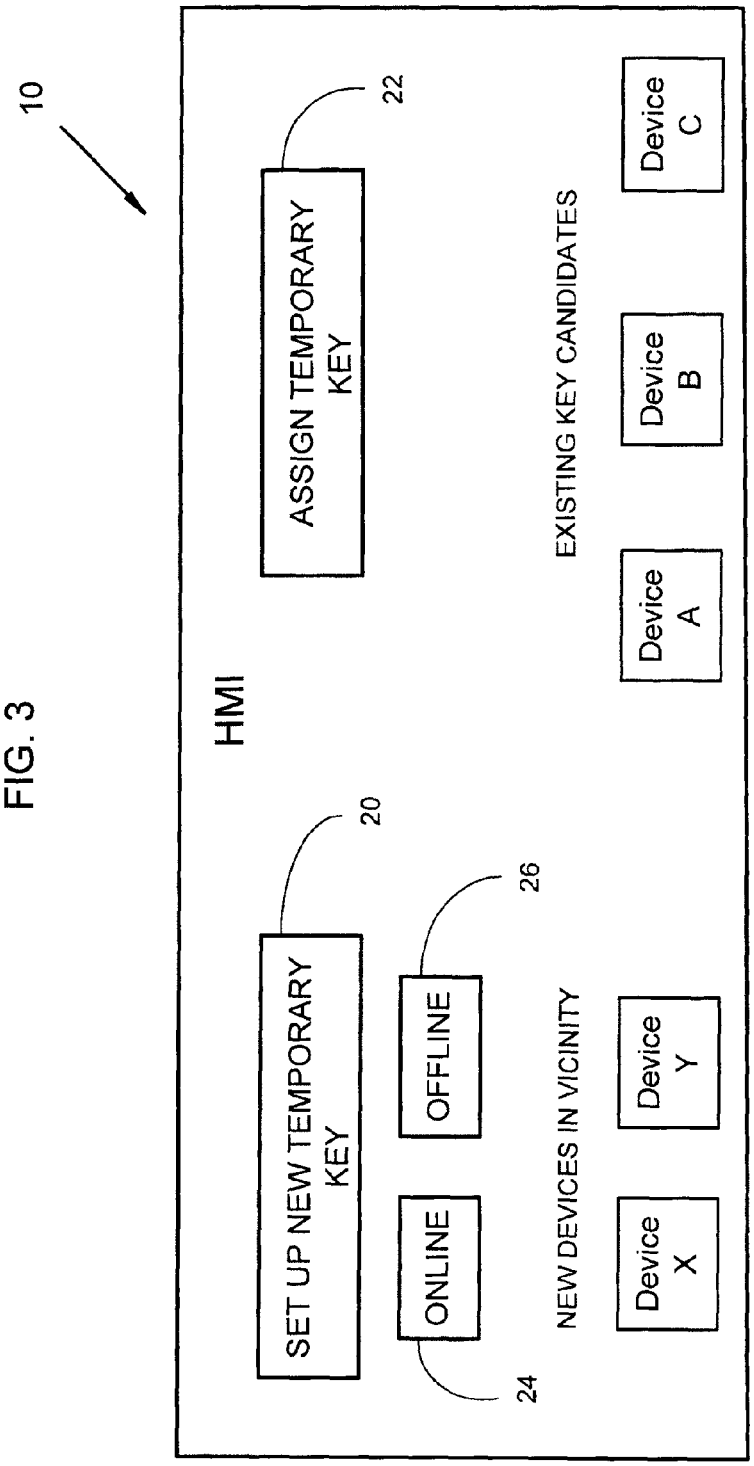
FIG. 3 is an example screen shot of the vehicle human machine interface in a second step of the method of FIG. 1.

In operation, the user may view the display of FIG. 3 and may choose to set up a new device online by touching ONLINE icon 24. The user may then touch the icon representing mobile device X under the SET UP NEW TEMPORARY KEY icon 20 to thereby select device X to be set up to receive a temporary key to the vehicle. In response, head unit 32, having already discovered and identified device X, as indicated at 40, may request, as indicated at 44, that a certificate authority 42 of central controller 38 transmit a certificate to device X.

Figure 4:
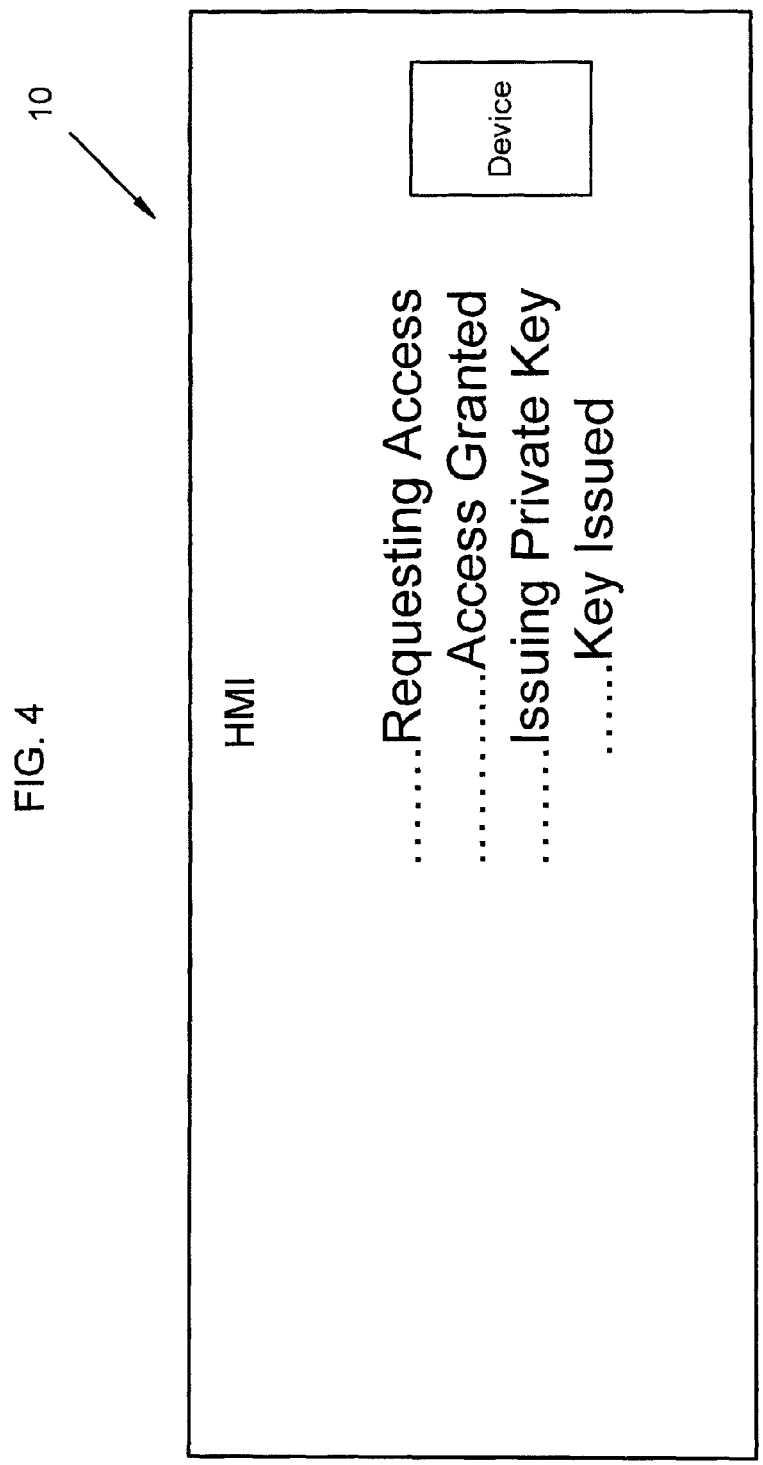
FIG. 4 is an example screen shot of the vehicle human machine interface in a third step of the method of FIG. 1.

Next, in step 106, the status of the key issuance may be displayed. For example, the display screen of the HMI may display the words "Requesting Access", as illustrated in FIG. 4. Certificate authority 42 may respond to request 44 by transmitting a certificate to device X, as indicated at 46.

After having set up device X to receive a temporary key, as described above, the user may want to actually assign a temporary key to device X by touching ASSIGN TEMPORARY KEY icon 22. The user may then touch the icon representing mobile device X under the ASSIGN TEMPORARY KEY icon 22 to thereby select device X to be assigned a temporary key to the vehicle. In response, head unit 32, having already set up device X by causing certificate authority 42 to send a certificate to device X, as indicated at 44 and 46, may request, as indicated at 40, that device X send to head unit 32 the certificate that device X has received. After head unit 32 has received the certificate from device X, head unit 32 may send the certificate to validation authority 48 of central controller 38, as shown at 50, so that validation authority 48 may verify to head unit 32, as indicated at 50, that the certificate received by validation authority 48 from head unit 32 is the same as, or matches, the certificate sent to device X by certificate authority 42. If the certificate received by validation authority 48 from head unit 32 is indeed the same as, or matches, the certificate sent to device X by certificate authority 42, then the HMI may display "Access Granted", as shown in FIG. 4.

Head unit 32 may then essentially issue a private key to device X in the sense that head unit 32 may download to device X a user interface that may be displayed on the touchscreen of device X. In response, the HMI may display "Issuing Private Key" while the interface is being downloaded, and the HMI may display "Key Issued" when the download is complete, as shown in FIG. 4. The user interface displayed on the touchscreen of device X may enable the user/owner of device X to perform all of the functions of a conventional key and key fob, such as unlocking the doors to the vehicle, and starting the ignition system of the vehicle. Thus, head unit 32 may be communicatively coupled to ignition system 34 and to door lock controls 36 in order to provide such functionality.

Figure 5:
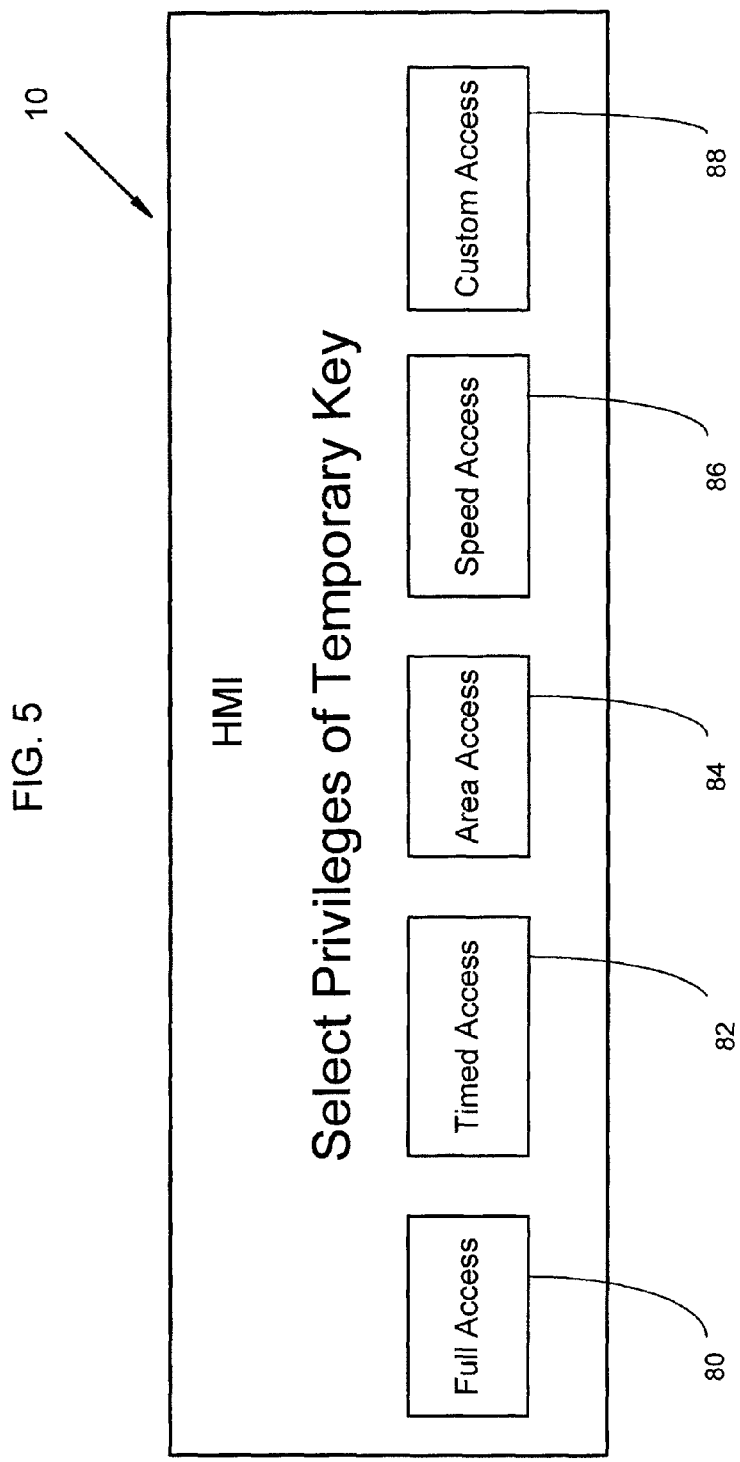
FIG. 5 is an example screen shot of the vehicle human machine interface in a fourth step of the method of FIG. 1.

In a final step 108, the user may be prompted to select privileges that the temporary key is to have. For example, before or after issuing the private key, head unit 32 may enable the user/owner of the vehicle to select privileges afforded to the temporary private key, as shown in FIG. 5, which illustrates the display screen of the HMI. The user may elect to grant the key full access by touching icon 80; timed access by touching icon 82; area access by touching icon 84; speed access by touching icon 86; and/or custom access by touching icon 88. Timed access may include providing the key functionality only during certain times of the day, e.g., from 6 am to 6 pm on weekdays only, during daylight hours only, etc. Area access may include providing the key functionality only within a certain geographic area, e.g., within a certain state, within a certain county, or along a certain approved route. Speed access may include inhibiting the vehicle from traveling above a certain speed that is set by the vehicle owner so long as the vehicle has been unlocked or started by the key that is subject to the speed limitation. Custom access may include a combination of time, geographic, and speed limitations. For example, the user may restrict the speed of the vehicle only during certain times of the day (e.g., at night) or within certain geographic areas (e.g., a neighborhood in which the vehicle owner resides) so long as the vehicle has been unlocked or started by the key that is subject to the speed limitation.

Figure 7:
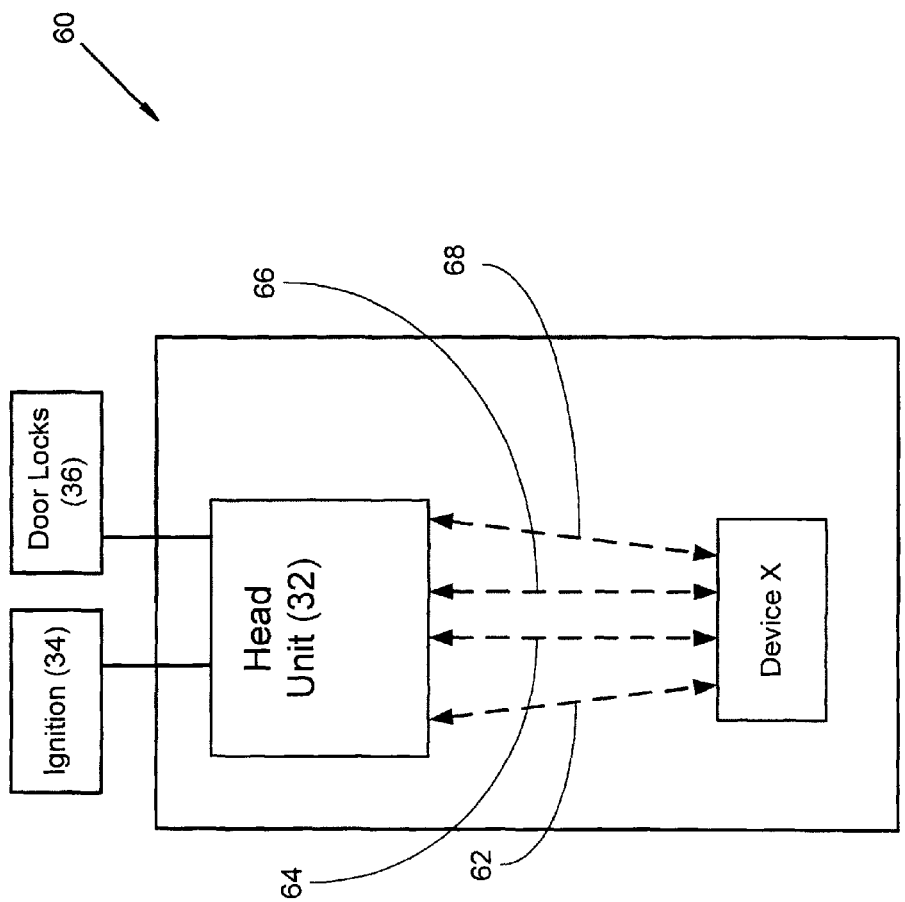
FIG. 7 is a block diagram of a second embodiment of a system of the invention for assigning a smartphone as a temporary key for a vehicle.

FIG. 7 is a block diagram of one embodiment of a system 60 of the invention for offline assignment of a temporary key for a vehicle to a smartphone X. System 60 may employ Bluetooth, for example, as a communication technology. System 60 includes a vehicle head unit 62, a vehicle ignition system 34, and vehicle door lock controls 36.

In operation, the user may view the display of FIG. 3 and may choose to set up a new device offline by touching OFFLINE icon 26. In response, head unit 32 may search for, discover and identify device X, as indicated at 62 and 64. After device X has been discovered and identified, an icon representing mobile device X may be displayed on the display. The user may then touch the icon representing mobile device X under the SET UP NEW TEMPORARY KEY icon 20 to thereby select device X to be set up to receive a temporary key to the vehicle.

The user may touch ASSIGN TEMPORARY KEY icon 22 and then touch the icon representing mobile device X in order to assign a new temporary key to device X. In response to the touching of ASSIGN TEMPORARY KEY icon 22 and the icon representing mobile device X, head unit 32 may pair with device X, as indicated at 66 in order to actually assign a temporary key to device X. In one embodiment, pairing with device X may include head unit 32 downloading to device X a user interface that may be displayed on the touchscreen of device X. After receiving the user interface, device X may connect with head unit 32 by acknowledging that the user interface has been received, as indicated at 68.

The present invention has been described herein as using a smartphone as a temporary key. However, it is to be understood that the present invention may also encompass using a tablet computer or other handheld smart device as a temporary key.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of providing access to a vehicle, comprising the steps of:
   wirelessly and electronically discovering a personal electronic device disposed outside of the vehicle;
   wirelessly instructing a remote central controller to wirelessly transmit a certificate to the personal electronic device;
   wirelessly receiving within the vehicle the certificate from the personal electronic device;
   wirelessly receiving within the vehicle validation from the remote central controller that the certificate that the vehicle has received from the personal electronic device was transmitted from the remote central controller to the personal electronic device; and
   wirelessly transmitting from the vehicle to the personal electronic device an electronic key to the vehicle.

2. The method of claim 1 comprising the further step of receiving a selection of the personal electronic device from a user, the wirelessly instructing step including instructing the remote central controller to wirelessly transmit the certificate to the selected personal electronic device.

3. The method of claim 1 comprising the further step of starting an ignition of the vehicle in response to receiving a command from the personal electronic device.

4. The method of claim 1 comprising the further step of locking or unlocking a door of the vehicle in response to receiving a command from the personal electronic device.

5. The method of claim 1 comprising the further step of enabling a user to specify at least one privilege to be given the electronic key.

6. The method of claim 5 wherein at least one privilege includes at least one of:
   a geographical area in which the electronic key is operational; and
   a range of speeds at which the vehicle may travel after being accessed by the key.

7. The method of claim 1 wherein the electronic key only temporarily enables access to the vehicle.

8. A method of providing access to a vehicle, comprising the steps of:
   wirelessly and electronically discovering a personal electronic device disposed outside of the vehicle;
   receiving a selection of the personal electronic device from a user;
   wirelessly receiving within the vehicle a certificate from the selected personal electronic device;
   after the certificate from the selected personal electronic device has been wirelessly received within the vehicle, wirelessly receiving within the vehicle validation from the remote central controller that the certificate from the selected personal electronic device was transmitted from the remote central controller to the selected personal electronic device; and
   wirelessly transmitting from the vehicle to the selected personal electronic device an electronic key to the vehicle.

9. The method of claim 8 further comprising the step of displaying an icon representing the discovered personal electronic device on a display of the vehicle, wherein the receiving step includes sensing the user touching the icon.

10. The method of claim 8 comprising the further step of starting an ignition of the vehicle in response to receiving a command from the personal electronic device.

11. The method of claim 8 comprising the further step of locking or unlocking a door of the vehicle in response to receiving a command from the personal electronic device.

12. The method of claim 8 comprising the further step of enabling a user to specify at least one privilege to be given the electronic key.

13. The method of claim 12 wherein at least one privilege includes at least one of:
   a geographical area in which the electronic key is operational; and
   a range of speeds at which the vehicle may travel after being accessed by the key.

14. The method of claim 8 wherein the electronic key only temporarily enables access to the vehicle.

15. A method of providing access to a vehicle, comprising the steps of:
   enabling a user to choose between providing access online and providing access offline;
   if the user chooses providing access online, then:

electronically discovering a personal electronic device disposed outside of the vehicle;
instructing a remote central controller to transmit a certificate to the personal electronic device;
receiving within the vehicle the certificate from the personal electronic device;
receiving within the vehicle validation from the remote central controller that the certificate previously received by the vehicle from the personal electronic device was transmitted from the remote central controller to the personal electronic device; and
transmitting from the vehicle to the personal electronic device an electronic key to the vehicle; and
if the user chooses providing access offline, then;
electronically discovering a personal electronic device disposed outside of the vehicle;
receiving a selection of the personal electronic device from a user; and
transmitting from the vehicle to the selected personal electronic device an electronic key to the vehicle.

16. The method of claim 15 comprising the further step of receiving a selection of the personal electronic device from a user, the instructing step including instructing the remote central controller to transmit the certificate to the selected personal electronic device.

17. The method of claim 15 comprising the further step, in response to receiving a command from the personal electronic device, of at least one of:
starting an ignition of the vehicle;
locking a door of the vehicle; and
unlocking a door of the vehicle.

18. The method of claim 15 comprising the further step of enabling a user to specify at least one privilege to be given the electronic key.

19. The method of claim 18 wherein at least one privilege includes at least one of:
a geographical area in which the electronic key is operational; and
a range of speeds at which the vehicle may travel after being accessed by the key.

20. The method of claim 15 wherein the electronic key only temporarily enables access to the vehicle.

* * * * *